United States Patent
Hsu et al.

(10) Patent No.: US 8,099,401 B1
(45) Date of Patent: Jan. 17, 2012

(54) EFFICIENTLY INDEXING AND SEARCHING SIMILAR DATA

(75) Inventors: Windsor W. Hsu, San Jose, CA (US); R. Hugo Patterson, Mountain View, CA (US)

(73) Assignee: EMC Corporation, Hopkinton, MA (US)

( * ) Notice: Subject to any disclaimer, the term of this patent is extended or adjusted under 35 U.S.C. 154(b) by 587 days.

(21) Appl. No.: 11/779,486

(22) Filed: Jul. 18, 2007

(51) Int. Cl.
G06F 7/00 (2006.01)
G06F 17/30 (2006.01)
(52) U.S. Cl. .. 707/705; 707/804; 707/821; 707/999.205
(58) Field of Classification Search .................. None
See application file for complete search history.

(56) References Cited

U.S. PATENT DOCUMENTS

| | | | |
|---|---|---|---|
| 5,990,810 A | 11/1999 | Williams | |
| 6,360,215 B1* | 3/2002 | Judd et al. | 1/1 |
| 7,007,141 B2 | 2/2006 | Lee et al. | |
| 7,065,619 B1 | 6/2006 | Zhu et al. | |
| 7,143,251 B1 | 11/2006 | Patterson | |
| 2005/0144162 A1* | 6/2005 | Liang | 707/3 |
| 2005/0149499 A1* | 7/2005 | Franz et al. | 707/3 |
| 2005/0160107 A1* | 7/2005 | Liang | 707/100 |
| 2006/0059144 A1* | 3/2006 | Canright et al. | 707/5 |
| 2007/0073689 A1* | 3/2007 | Chandra | 707/6 |
| 2007/0078880 A1* | 4/2007 | Eiron et al. | 707/102 |
| 2007/0226213 A1* | 9/2007 | Al-Masri | 707/7 |
| 2007/0244915 A1* | 10/2007 | Cha et al. | 707/101 |
| 2008/0104542 A1* | 5/2008 | Cohen et al. | 715/810 |
| 2008/0168048 A1* | 7/2008 | Bell et al. | 707/5 |
| 2008/0208829 A1* | 8/2008 | Limonov | 707/4 |
| 2008/0263023 A1* | 10/2008 | Vailaya et al. | 707/5 |
| 2008/0297848 A1* | 12/2008 | Mizutani et al. | 358/1.16 |
| 2008/0313184 A1* | 12/2008 | Li et al. | 707/7 |
| 2008/0313213 A1* | 12/2008 | Zhang et al. | 707/102 |
| 2008/0319954 A1* | 12/2008 | Boettiger | 707/3 |

OTHER PUBLICATIONS

Andrei Z. Broder, et al. "Indexing Shared Content in Information Retrieval Systems", 18pp.
Falk Scholer, et al., "Compression of Inverted Indexes for Fast Query Evaluation", School of Computer Science and Information Technology, RMIT University, GPO Box 2476V, Melbourne, Australia, 3001, 8pp.
Andrei Z. Broder, et al., "Syntactic Clustering of the Web", SRC Technical Note 1997-015, Jul. 25, 1997, Digital Systems Research Center, 130 Lytton Avenue, Palo Alto, CA 94301, Copyright 1997 Digital Equipment Corporation. All Rights Reserved, http://www.research.digital.com/src/, 13pp.

* cited by examiner

*Primary Examiner* — Wilson Lee
*Assistant Examiner* — Jessica N Le
(74) *Attorney, Agent, or Firm* — Blakely Sokoloff Taylor & Zafman LLP

(57) ABSTRACT

Techniques for efficiently indexing and searching similar data are described herein. According to one embodiment, in response to a query for one or more terms received from a client, a query index is accessed to retrieve a list of one or more super files. Each super file is associated with a group of similar files. Each super file includes terms and/or sequences of terms obtained from the associated group of similar files. Thereafter, the super files representing groups of similar files are presented to the client, where each of the super files includes at least one of the queried terms. Other methods and apparatuses are also described.

23 Claims, 14 Drawing Sheets

File 1  rock

File 4  rock paper

File 5  rock paper scissor

| File ID | Location within Super File | | | | | |
|---|---|---|---|---|---|---|
| File 1 | Location of first segment within the corresponding super file | Location of second segment within the corresponding super file | ... | | | |
| File 2 | | | | Location of first segment within the corresponding super file | Location of second segment within the corresponding super file | ... |

FIG. 4C

EFFICIENTLY INDEXING AND SEARCHING SIMILAR DATA

FIELD OF THE INVENTION

The present invention relates generally to indexing and searching data. More particularly, this invention relates to indexing and searching similar data.

BACKGROUND

As data volume grows, being able to effectively search the data becomes increasingly critical. One problem is that the index needed to support searches of the data tends to be very large, and to take a lot of time and computing resources to create. Another problem is that in many environments (e.g. data protection or backup systems, version control systems, email servers, etc), the data being indexed contains a lot of similarity so that the search results tend to be cluttered with similar data.

One of the most popular index is the inverted index as shown in FIG. 1. An inverted index (also referred to as postings file or inverted file) is an index structure storing a mapping from words to their locations in a document or a set of documents, allowing full text search.

One conventional approach to reducing the size of the index is to encode the file IDs in the posting lists using a smaller number of bits. The resulting index is, however, still very large. This approach does not leverage any similarity in the data and is an orthogonal and complementary approach to the current invention. Another conventional approach is to detect and skip identical files to effectively index only one copy of a file. This, however, has no effect on near identical files.

Recently, another approach is to partition original files into virtual sub files and to index the virtual sub files. By carefully tracking how the sub files map to the original files, it is possible to preserve the traditional query semantics during query processing. Such an approach requires significant changes to a query engine. Because of the need to quickly map sub files to original files during query processing, assumptions have to be made about the similarity model and/or restrictions have to be placed on the types of queries that can be handled. For example, one assumption may be that similar files share content in a top-down hierarchical manner and one restriction may be that proximity queries are disallowed. In addition, the mapping needs to be carefully arranged so that the index cannot be incrementally updated. Because the traditional query semantics are preserved during query processing, this approach does not address the cluttering of query results with similar data.

SUMMARY OF THE DESCRIPTION

Techniques for efficiently indexing and searching similar data are described herein. According to one embodiment, in response to a query for one or more terms received from a client, an index is accessed to retrieve a list of one or more super files. Each super file is associated with a group of similar files. Each super file includes terms and/or sequences of terms obtained from the associated group of similar files. Thereafter, the super files representing groups of similar files are presented to the client, where each of the super files includes at least one of the queried terms.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 4A-4C are diagrams illustrating relationships between super files, groups, and similar files according to certain embodiments of the invention.

DETAILED DESCRIPTION

Techniques for efficiently indexing and searching similar data are described herein for indexing and searching data that takes advantage of similarity in the data to improve the efficiency of the system and to cluster search results. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, a pre-process is performed to identify and group similar data before handing the grouped data to an index engine. The index and corresponding query engines operate on the grouped data as per usual but because of the way the data has been grouped, the query semantics is effectively relaxed during query processing. An optional post-process efficiently detects and corrects any inaccuracies that may have been introduced by the grouping. A key feature of the technique is that it leverages existing index and query engines.

Figure 2:
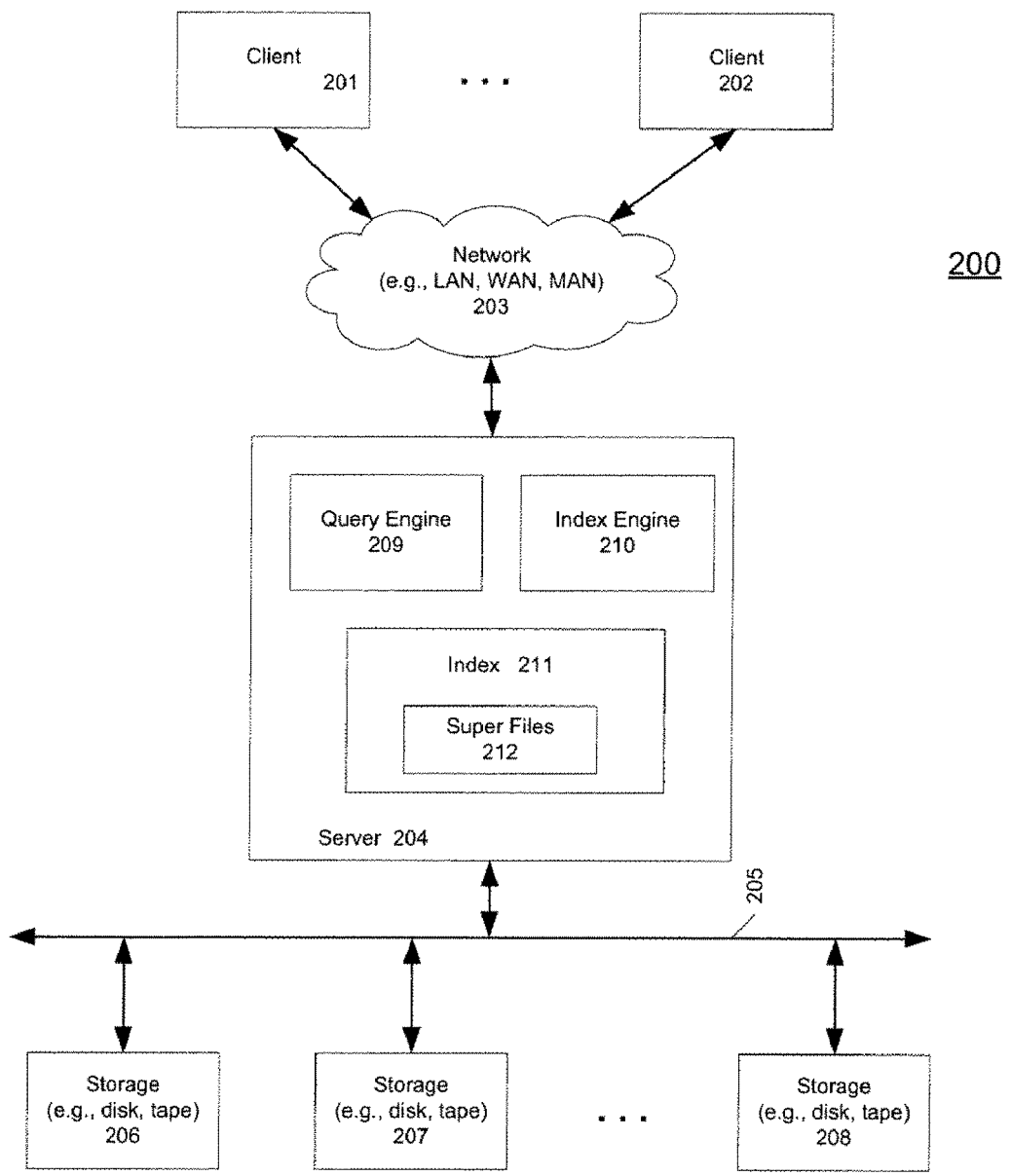
FIG. 2 is a block diagram illustrating a system configuration according to one embodiment of the invention.

FIG. 2 is a block diagram illustrating a system configuration according to one embodiment of the invention. Referring to FIG. 2, system configuration 200 includes, but is not limited to, one or more clients 201-202 communicatively coupled to a server 204 over a network 203 to access data stored in any of storage 206-208 over interconnect or network connection 205. Clients 201-202 may be any type of client such as a personal computer, a "thin" client, a personal digital assistant (PDA), a Web enabled appliance, or a Web enabled cellular phone, etc. Server 204 may include any type of server or cluster of servers, which may be configured as a file server, a backup server, a database server, a web server, an application server or a combination thereof. Likewise, network 203 may be any type of network such as a local area network (LAN), a wide area network (WAN), or a metropolitan area network (MAN). Interconnect or network connection 205 may be implemented as a bus or a connection over a network such as a storage area network (SAN). Storage 206-208 may be any type of storage such as a disk, a tape, an array of disks or tapes, or a combination thereof. Server 204 and/or storage 206-208 may be implemented as part of an archive and/or backup systems such as the deduplication systems available from Data Domain, Inc. of Santa Clara, Calif.

In one embodiment, a file may be stored or archived in storage 206-208 as multiple unique or deduplicated segments which may be represented via unique identifiers. That is, before a file is stored in storage, the file is partitioned into multiple segments. Only the unique or non-duplicated segments are stored in the storage to reduce storage space. Further detailed information regarding certain deduplicated data storage techniques may be found in U.S. Pat. Nos. 7,065,619 and 7,143,251, which have been assigned to a common assignee of this application. The disclosure of the above-mentioned patents and application is incorporated by reference herein in its entirety.

Server 204 may include a search facility which may be used to search certain files (or records, documents, data objects, etc) stored in storage 206-208 in view of certain terms. In one embodiment, server 204 includes a query engine 209, an index engine 210, and index 211. The query engine 209, an index engine 210, and index 211 may be implemented as part of a commercially available search engine, such as, for example, Google, Yahoo!, Microsoft, as well as Lucene™ from the open source community, etc. In response to a query for certain terms, query engine 209 accesses index 211 to retrieve one or more super files 212 which have been previously indexed by index engine 210. Each super file is associated with a group of similar files and may contain substantially all terms or sequences of terms of the similar files or segments of the similar files in the group.

Figure 5A:
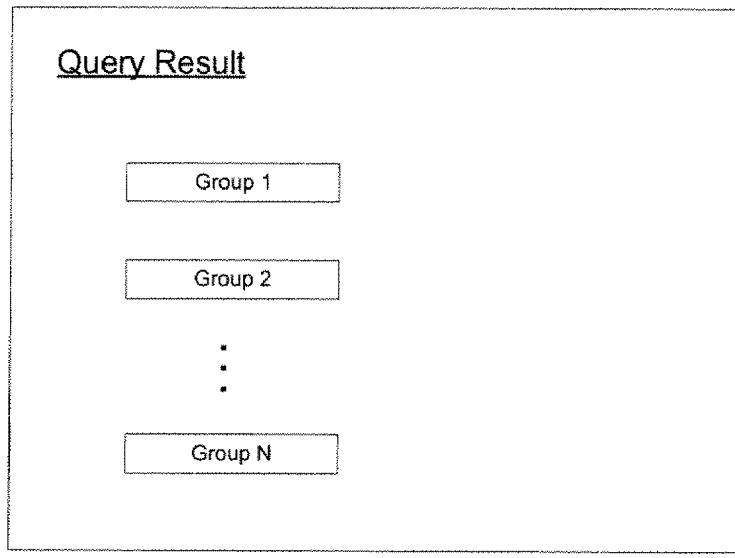
FIGS. 5A-5B are diagrams illustrating query result presentation interfaces according to certain embodiments of the invention.
Figure 5B:
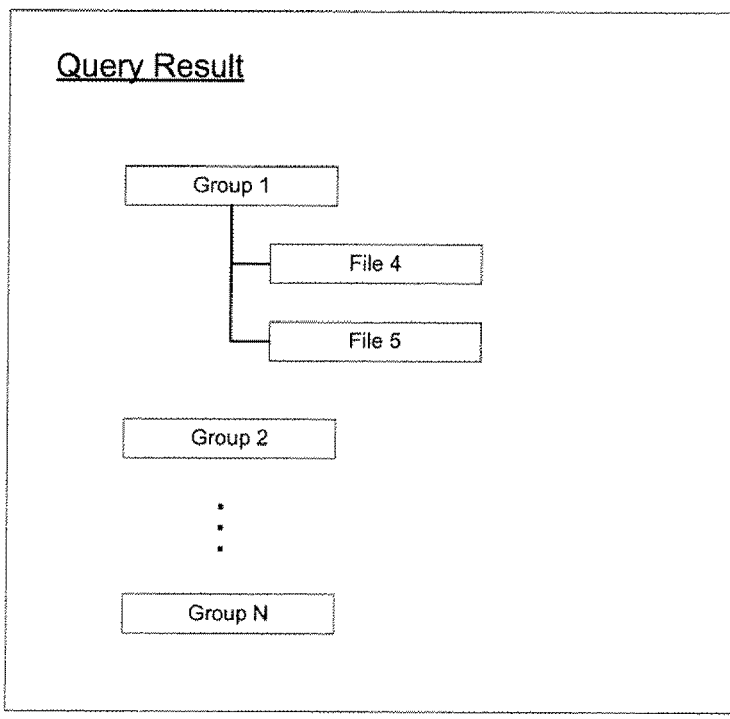

In view of the search terms, according to one embodiment, a list of super files are identified via index 211, where each super file corresponds to a group of similar files. A query result having a list of groups of similar files is presented to a client that originates the query, for example, as shown in FIG. 5A. In response to a further input for selecting one of the groups, individual similar files associated with the selected group with optional optimization to reduce inaccuracies are presented to the client, for example, as shown in FIG. 5B. Since the index 211 is constructed based on super files, each corresponding to a group of similar files, the index 211 can be maintained in a relatively small size and the search conducted therein is relatively fast. As a result, fewer entries are maintained in the posting lists and fewer IDs are maintained for more compact encoding. Other configurations may also be implemented.

Figure 3:
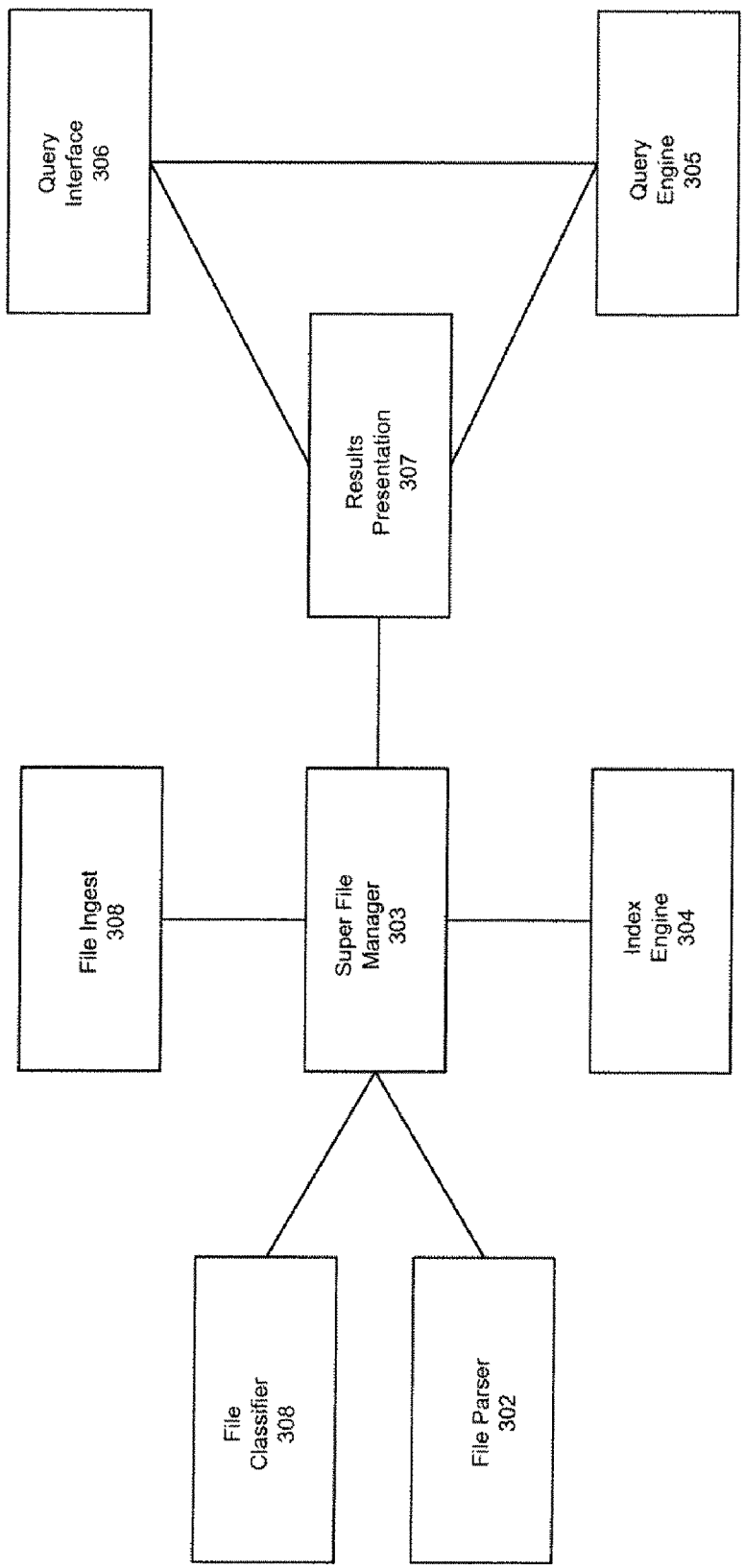
FIG. 3 is a block diagram illustrating an example of a server according to one embodiment of the invention.

FIG. 3 is a block diagram illustrating an example of a server according to one embodiment of the invention. For example, system 300 may be implemented as part of server 204 of FIG. 2. Referring to FIG. 3, according to one embodiment, system 300 includes, but is not limited to, file classifier 301, file parser 302, a super file manager 303, an index engine 304, query engine 305, query interface 306, result presentation unit 307, and file ingest unit 308. According to one embodiment, when file ingest unit 308 receives a set of files to be indexed, file classifier 301 groups certain similar files into one or more groups, for example, by matching filenames, sketches, segments, etc.

For each group, super file manager 303 constructs a super file to include a super set of most or all of terms or sequences of terms of the similar files associated with the group. Depending on the type of file, file parser 302 may be required to parse and tokenize the files into terms to be included in the associated super file. Further, optionally, additional terms may be tagged along at each file boundary in the super file (e.g., sequences of terms) to support phrase and/or proximity queries. Further, for each group, the super file manager 303 may track which files belong to the group. Further, optionally, super file manager 303 may create a map for mapping each file to the super file of the group that the file belongs to, for example, including the locations in the super file at which the terms of the file appear.

Thereafter, in one embodiment, the super file is indexed by the index engine 304. Subsequently, when a query is received by query interface 306, query engine 305 is invoked to perform a query via a query index maintained by index engine 304 to retrieve a list of one or more super files that contain at least one of the queried terms and, optionally, the matching locations. Result presentation unit 307 then presents a list of one or more groups of similar files corresponding to the retrieved super files, for example, as shown in FIG. 5A. As an option, the list of one or more groups of similar files may be post processed to remove certain inaccuracies before being presented. The groups of similar files may also be expanded into the individual similar files for presentation.

Thus, instead of indexing actual files, super files representing groups of similar files are indexed and presented to a client in response to a query. As a result, the index maintained by index engine 304 may be implemented in a relatively small size and the search conducted therein can be much faster. In response to another input on the presented list of groups of similar files, individual files can then be presented and selected, for example, as shown in FIG. 5B, with optional further optimization or post process to remove certain inaccuracies. Note that some of all of the components as shown in FIG. 3 may be implemented in software, hardware, or a combination of both. The components of system 300 are shown in FIG. 3 for purposes of illustration only; more or fewer components may be implemented. Other configurations may exist.

Figure 1:
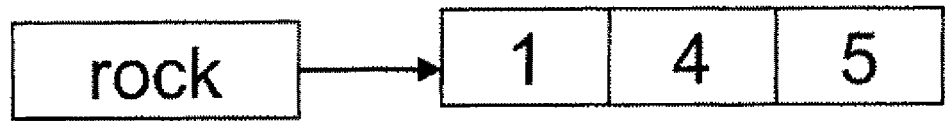
FIG. 1 is a diagram illustrating a conventional inverted index structure.
Figure 1:
Figure 1:
Figure 4A:
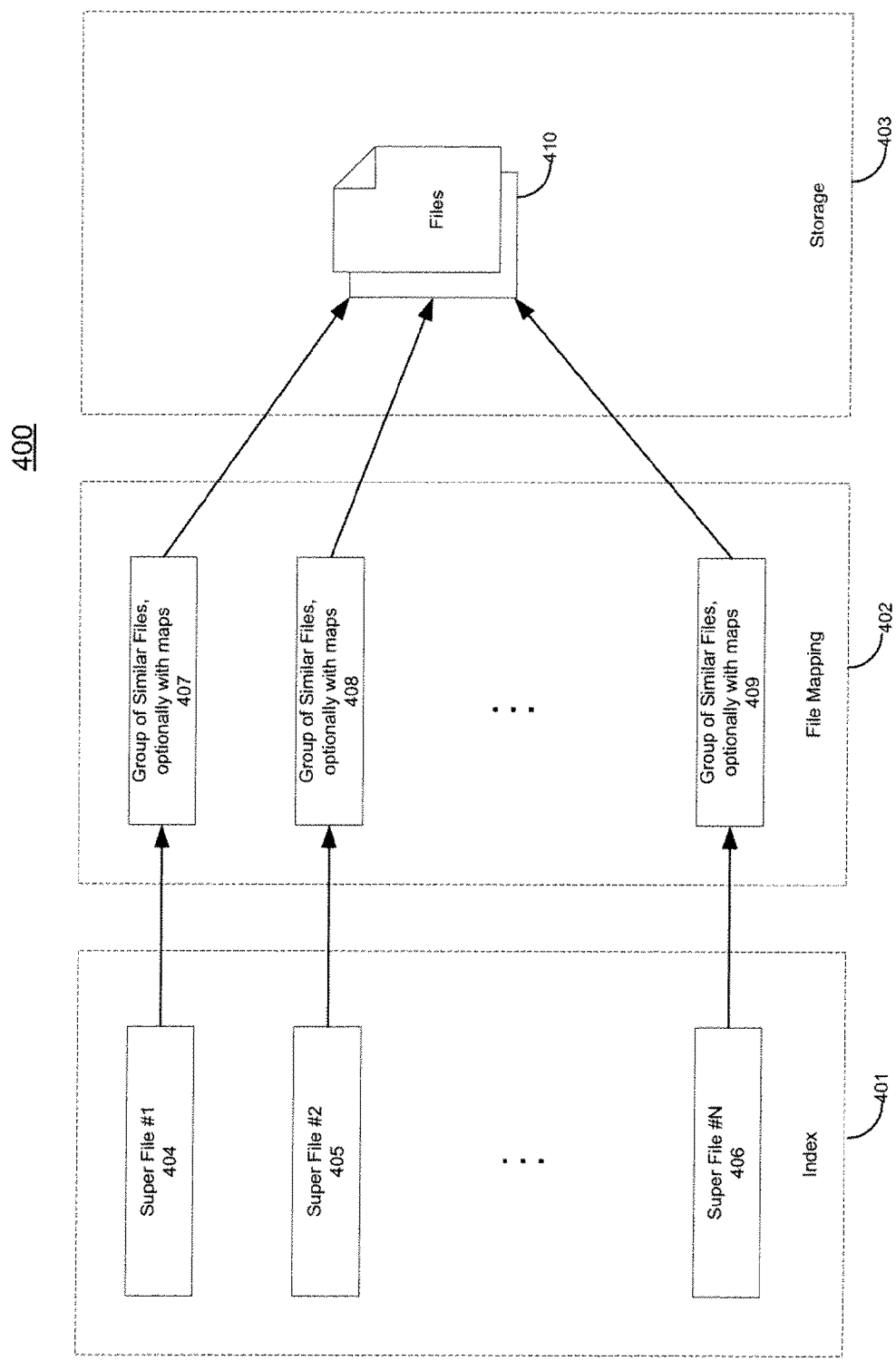
Figure 4B:
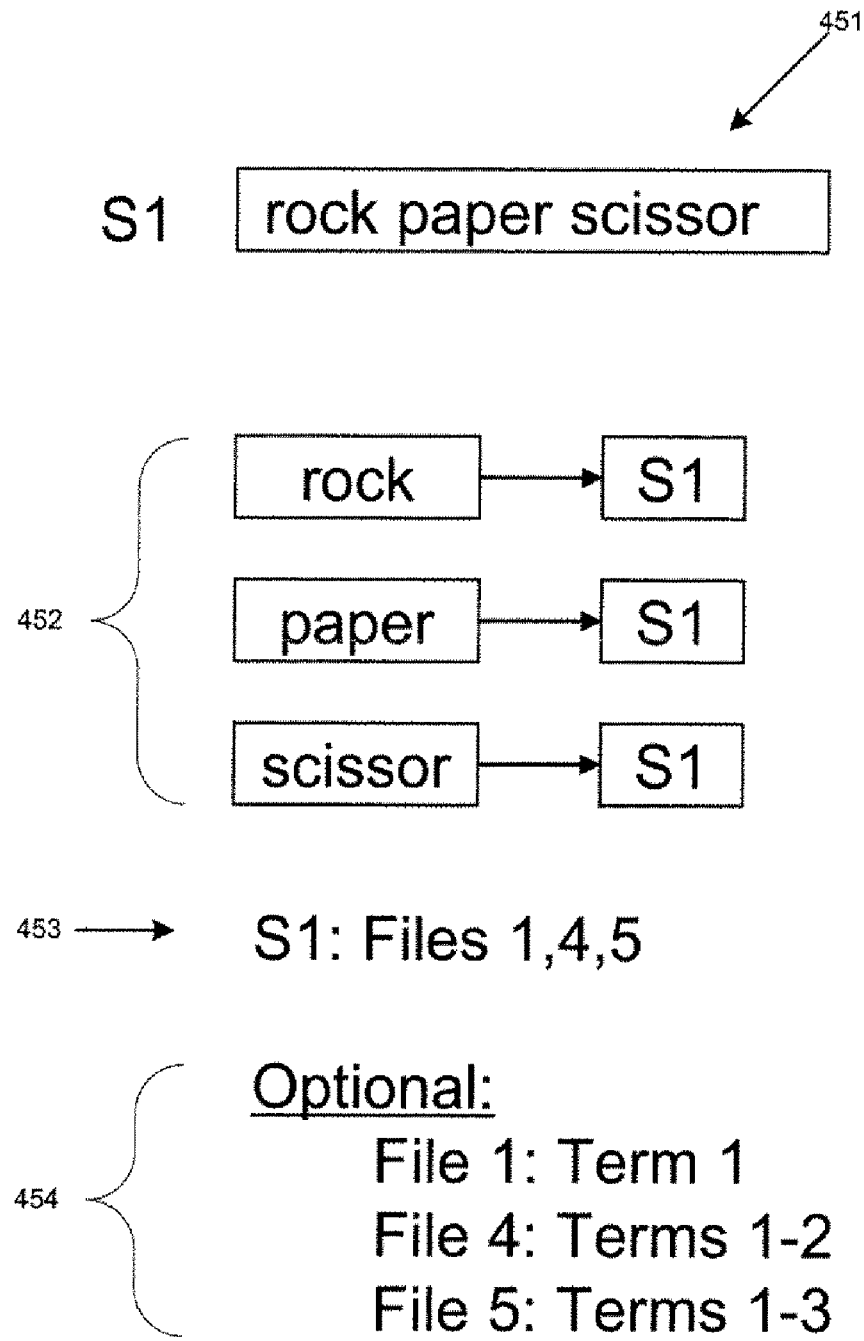

As described above, instead of indexing actual files, super files representing groups of similar files are indexed. FIG. 4A is a diagram illustrating relationships between super files, groups, and similar files according to one embodiment. Referring to FIG. 4A, super files 404-406 are constructed respectively for groups 407-409 of similar files 410 stored in storage 403. Each super file corresponds to one group of similar files. Super files 404-406 are indexed in an index 401 and mapping information 402 may be maintained to indicate which of the files 410 belong to a specific group. Optionally, as shown in FIG. 4B, the mapping information 402 may further include information 454 indicating the locations in a super file where each segment of a file appears. This is further illustrated in FIG. 4C. As a result, the index 401, which may be implemented as part of index 211 of FIG. 2, may be maintained in a relatively small size with respect to a conventional inverted index as shown in FIG. 1.

In response to a query, index 401 is accessed to retrieve a list of super files (e.g., super files 404-406) which in turn represent a list of groups (e.g., groups 407-409). Instead of presenting the actual files (e.g., files 410), a list of groups is presented to the client as shown in FIG. 5A, which may be performed in a much quicker manner. The actual files of a particular group may be presented as shown in FIG. 5B in response to a further request or selection selecting the group out of the list. A post process may further be performed to remove certain false matching.

Super files in a query result may be ranked or sorted according to a variety of algorithms including the commonly used ones based on term frequency and inverse document frequency. In one embodiment, super files are treated by the system as regular files for maintaining statistics used to sort the query results. For example, the term frequency for a term in a super file may be the total number of times the term appears in any file in the group associated with the super file. In one embodiment, the term frequency for a term in a super file may be the largest number of times the term appears in any one file of the group. Furthermore, the number of files in the group may be taken into account, for example, by normalizing the ranking score for a group in view of the number of files it contains. Other sorting techniques may also be utilized.

For the purposes of illustration, as shown in FIG. 4B, it is assumed that a super file 451 (e.g., super file S1) includes three terms: "rock", "paper", and "scissor", which are extracted from similar files 1, 4, and 5 of group 453 represented by super file 451 (e.g., super file S1). The super file is then indexed in index 452. Thus, instead of containing three files 1, 4, and 5, the index 452 contains one super file. Thus, fewer entries exist in the posting lists and fewer IDs need to be encoded. Subsequently, in response to a query, index 452 is accessed; super file 451 is retrieved; and group 453 is presented. Individual files 1, 4, and 5 may be presented as well in response to a further input.

Optionally, a post process may be performed to remove certain accuracies. Suppose that the query seeks files containing the term "paper". In this example, there is a match for the term "paper" in term 2 of super file 451. Files 4 and 5 overlap with the match location (term 2) while file 1 does not. Thus, the final result for group 453 may include files 4 and 5 but not file 1. In one embodiment, the list of super files retrieved from the index is post processed to remove groups where none of the files within the group actually matches the query.

Figure 6A:
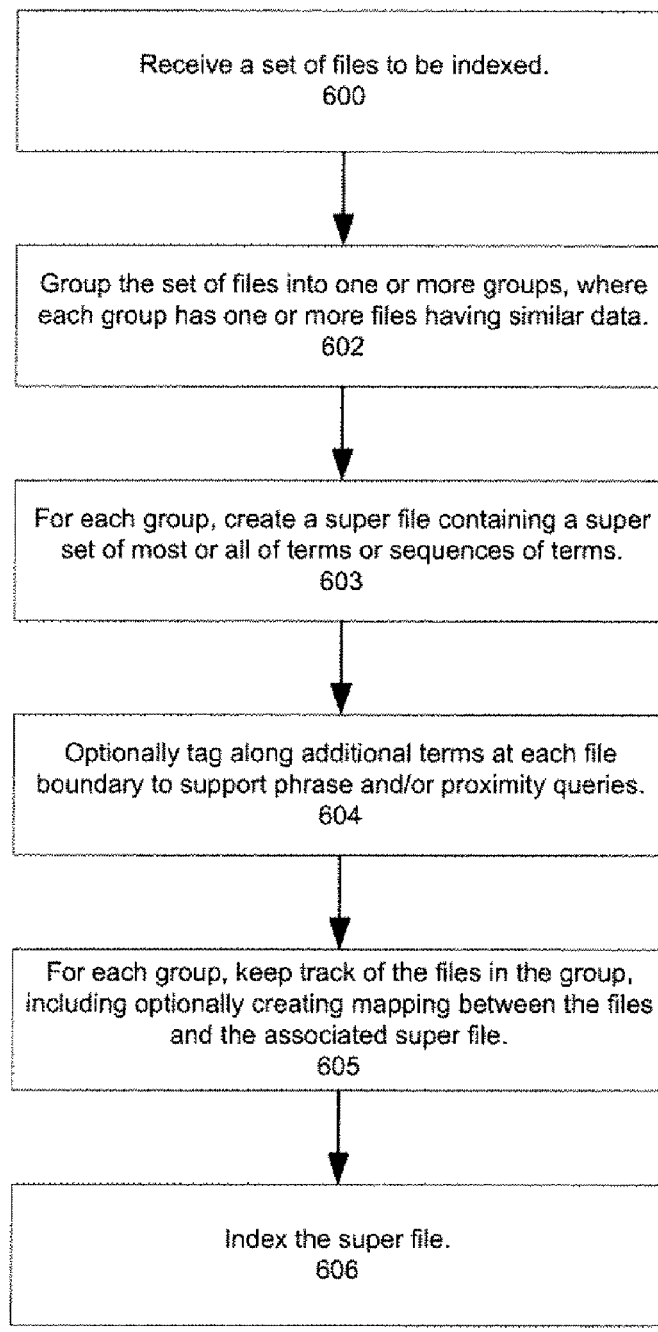
FIGS. 6A-6B are flow diagrams illustrating a process for forming a super file according to certain embodiments of the invention.

FIG. 6A is a flow diagram illustrating a process for forming a super file according to one embodiment of the invention. Note that process 600 may be performed by processing logic which may include hardware, software, or a combination of both. For example, process 600 may be performed by server 204 of FIG. 2 or system 300 of FIG. 3. Referring to FIG. 6, at block 601, processing logic receives a set of files to be indexed. In response, at block 602, the set of files are grouped into one or more groups of similar files. The files may be grouped according to several algorithms or technologies such as, for example, by matching filenames, sketches, and/or segments, etc.

For each group, at block 603, a super file is created to include most or all of the terms and/or sequences of terms extracted from the files associated with the respective group. For example, the files associated with a group may be parsed and tokenized into multiple terms and/or sequences of terms. Optionally, at block 604, processing logic may tag along additional terms at each file boundary to support certain phrase and/or proximity queries. For each group, at block 605, processing logic may keep track the files associated with the respective group. In one embodiment, a map may be maintained for mapping individual files in the group with respect to a super file associated with the group. For example, a location of a term or sequence of terms contained in a super file may be recorded for a file that includes such a term or sequence of terms. The mapping information may be maintained by a file system of a storage server. The mapping information may be maintained per file or alternatively, as a global mapping information base for each group, etc. Thereafter, at block 606, the super file for each group is indexed by an index engine of a query system, which may be used in subsequent queries. Other operations may also be performed.

As described above, multiple files may be grouped into one or more groups based on the similarities of the files. According to one embodiment, files may be grouped based on the filenames of the files. For example, with respect to backup data, a new version of a file is likely similar to its previous versions. In a particular example, contents of a mailbox is backed up today will be the contents of the mailbox backed up yesterday plus the emails received today minus the emails deleted today. According to another embodiment, files may be grouped based on similar sketches of the files, for example, using techniques discussed by Andrei Z. Border, et al., entitled "Syntactic Clustering of the Web," WWW '97, pp. 1157-1166, 1997, which is incorporated by reference herein.

Further, according to another embodiment, the files may be segmented into multiple segments and files may be grouped by matching the segments of the files. In one embodiment, processing logic may identify two files as similar by counting the number of common segments between the files. A common segment is a chunk of data with an identical or various size. Further detailed information concerning the techniques described above can be found in a co-pending U.S. patent application Ser. No. 11/486,957, filed Jun. 14, 2006, entitled "Partitioning a Data Stream Using Embedded Anchors," which has been assigned to a common assignee of the present application and is incorporated by reference herein.

In one embodiment, each segment is represented by a unique segment ID. Each file is represented by a unique file ID. For each file, a list of <segment ID, file ID> tuples is generated and sorted based on the segment ID. For each segment ID, processing logic "walks" through the sorted list to generate all possible pairs of <file ID, file ID> and counts the number of occurrences of each <file ID, file ID> pair. If the number of occurrences of a <file ID, file ID> pair is greater than or equal to a predetermined threshold, then the two files identified by the file IDs in the pair are considered similar. Alternatively, if a ratio between the number of occurrences of a <file ID, file ID> pair and the number of segments in the corresponding files is greater than or equal to a certain threshold, then the files are considered similar.

According to a further embodiment, since matching sketches or segments may be expensive, a hybrid approach may be utilized. For example, initially, files may be grouped based on their filenames. The groups are then merged by applying matching sketches and/or segments as described above. Other approaches apparent to one with ordinary skill in the art may also be applied herein.

Figure 6B:
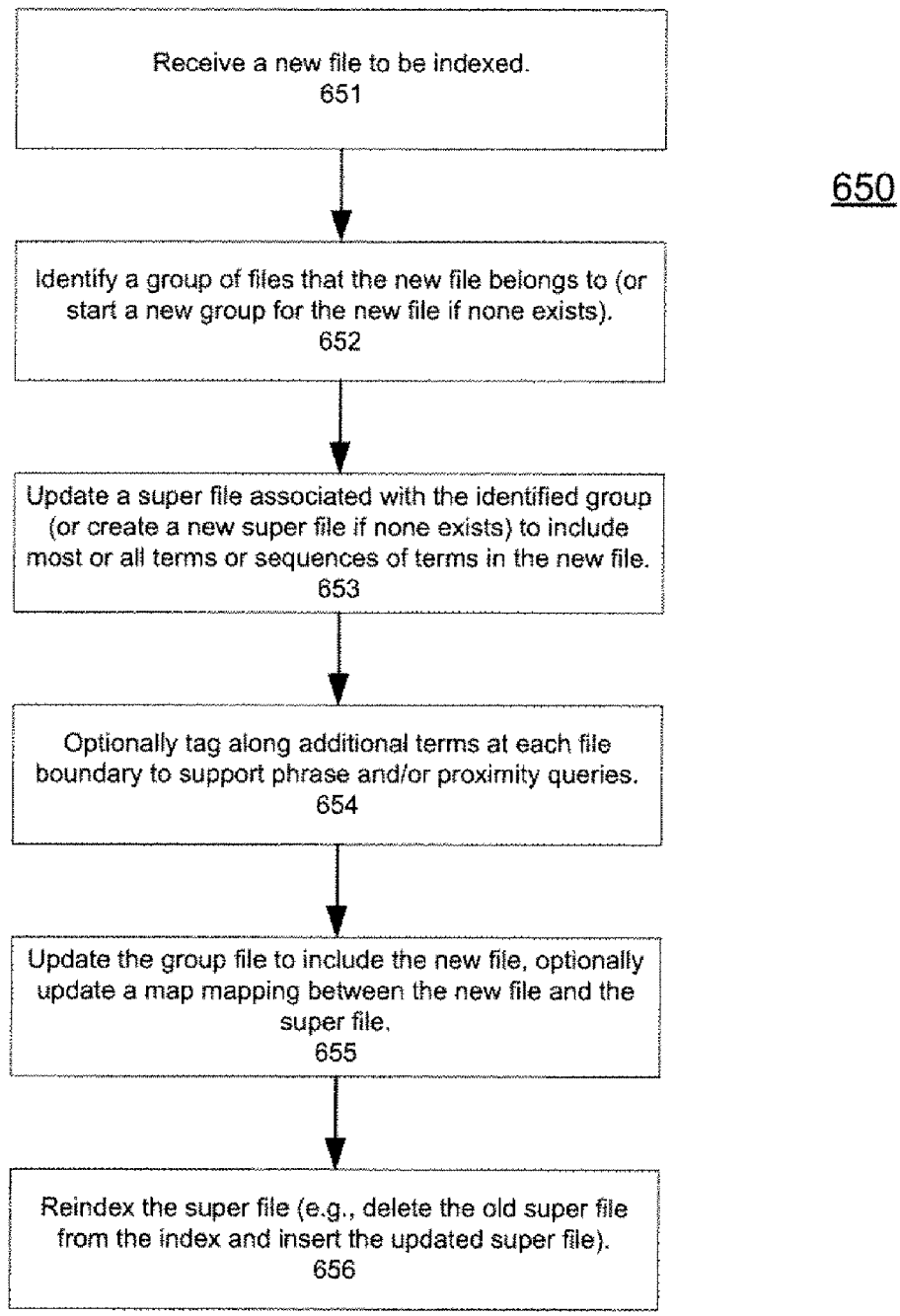

According to certain embodiments, an index and/or a super file may be updated in an incremental mode when a file is updated. FIG. 6B is a flow diagram illustrating a process for updating an index and/or super file according to one embodiment. Note that process 650 may be performed by processing logic which may include hardware, software, or a combination of both. For example, process 650 may be performed by server 204 of FIG. 2 or system 300 of FIG. 3. Referring to FIG. 6B, at block 651, when a new file is received to be indexed, at block 652, processing logic identifies a group of files that the new file belongs to based on the similarities of the new file in view of the files associated with the group, for example, using certain techniques described above. At block 653, a super file is identified for the identified group and updated to include most or all of the terms or sequences of terms obtained from the new file. If an existing group does not exist, a new group and a new super file may be created. Optionally, at block 654, processing logic may tag along additional terms at each file boundary to support phrase and/or proximity queries. At block 655, group information or mapping information is updated to include the new file in the identified group. Thereafter, the super file is reindexed at block 656. Other operations may also be performed.

Figure 7:
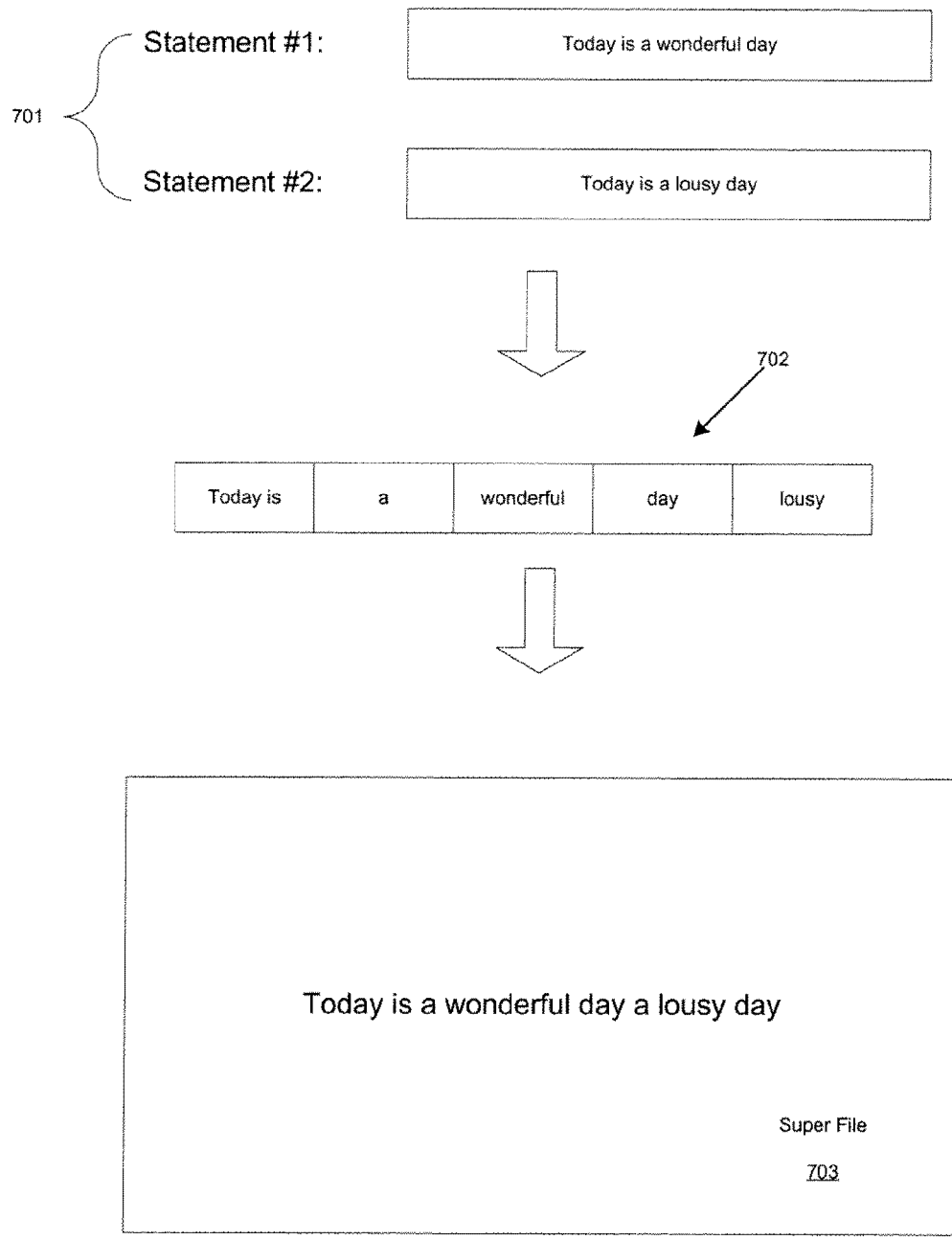
FIG. 7 is a block diagram illustrating a process for tagging along certain terms across a boundary of segments according to one embodiment.

As described above, in addition to including in the super file substantially all of the terms in a file, certain terms along the boundaries of certain segments of the file may be added to the super file to preserve the sequence of the terms to support phrase and/or proximity queries. For the purposes of illustration, FIG. 7 is a block diagram illustrating a process for tagging along certain terms across a boundary of segments according to one embodiment. Referring to FIG. 7, it is assumed that a file includes statements 701 of "Today is a wonderful day" and "Today is a lousy day". The file is then segmented into segments 702 having segments of "Today is", "a", "wonderful", "day", and "lousy". In this example, the resulting super file 703 includes each of the segments 702 arranged with additional terms such that adjacent terms in the file 701 also appear adjacent in the super file 703. In this particular example, the additional terms may be used to support phrase and/or proximity queries of up to two terms such as "lousy day".

Figure 8:
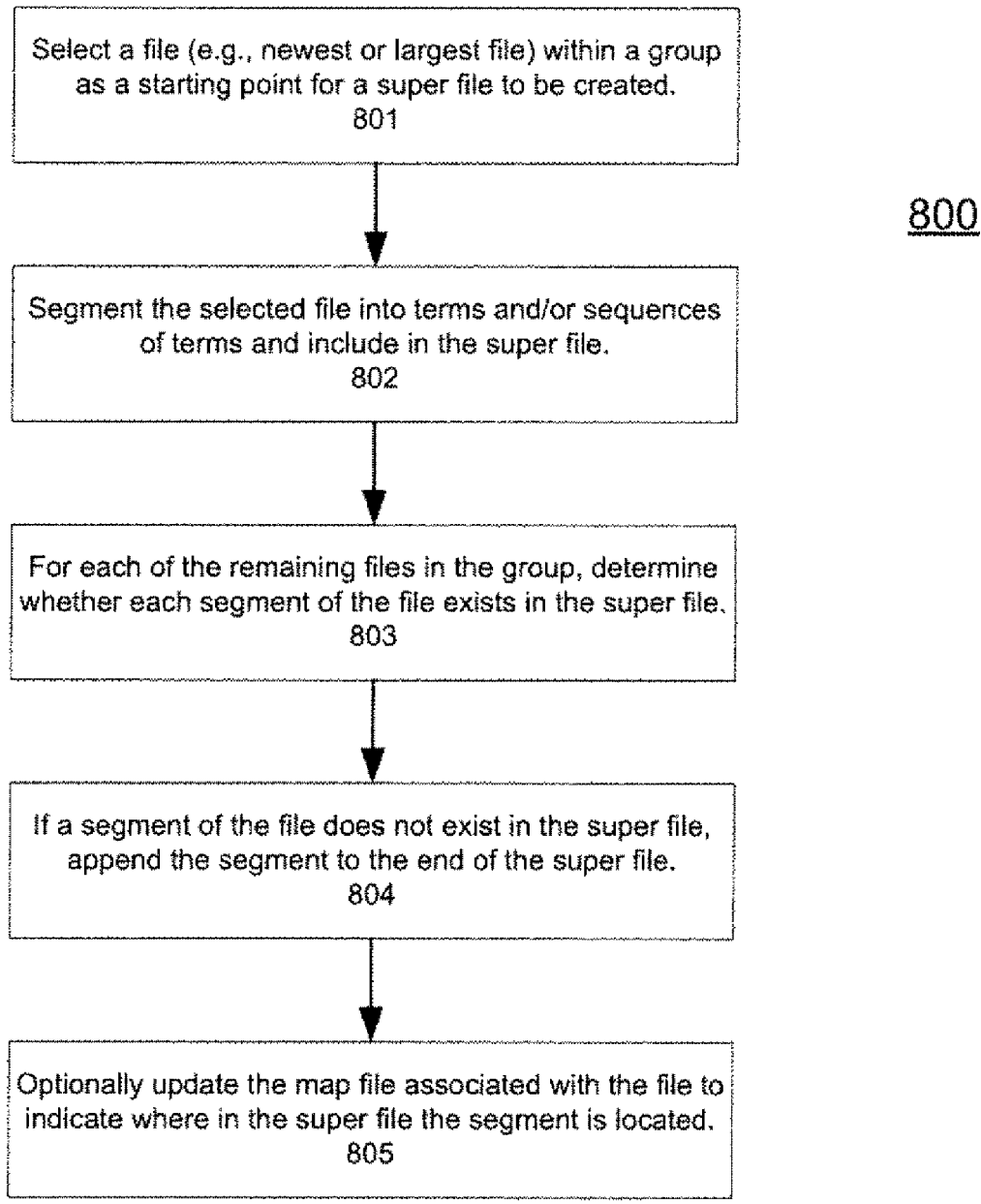
FIG. 8 is a flow diagram illustrating a process for creating a super file according to one embodiment of the invention.

FIG. 8 is a flow diagram illustrating a process for creating a super file according to one embodiment of the invention. Note that process 800 may be performed by processing logic which may include software, hardware, or a combination of both. For example, process 800 may be performed as part of operation of block 603 of FIG. 6A. Referring to FIG. 8, at block 801, in response to a group of similar files, a file is selected from the group as a starting point for a super file to be created. At block 802, the selected file is segmented into terms and/or sequences of terms and the terms and/or sequences of terms are then included in the super file. For each of the remaining files, at block 803, determine whether each segment of the remaining file exists in the super file. If a segment of the file does not exist in the super file, at block 604, the segment is appended to the super file (e.g., at the end of the super file). Optionally, at block 605, the mapping information associated with the file is updated to indicate where in the super file the segment is located. Other operations may also be performed.

Figure 9:
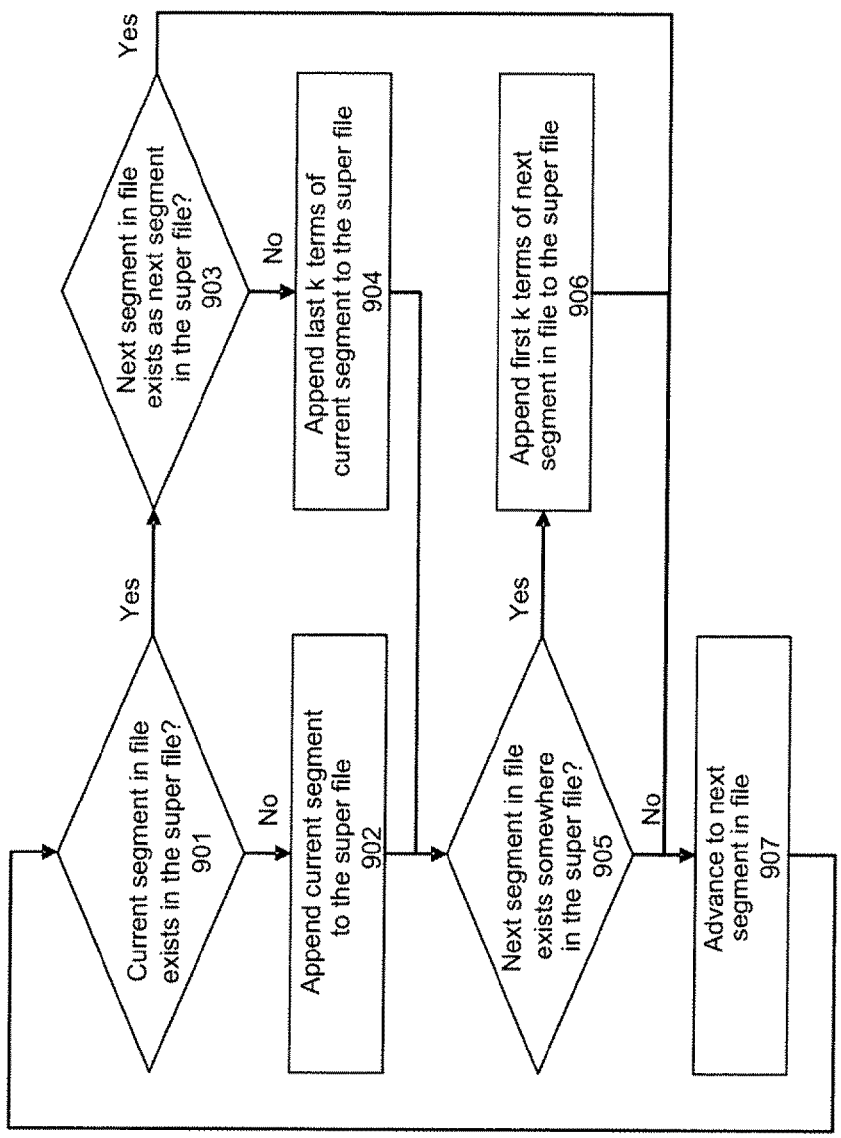
FIG. 9, is a flow diagram illustrating a process for creating a super file according to another embodiment of the invention.

FIG. 9, is a flow diagram illustrating a process for creating a super file according to another embodiment of the invention. Note that process 900 may be performed by processing logic which may include software, hardware, or a combination of both. For example, process 900 may be performed as part of operations of blocks 603-604 of FIG. 6A. Referring to FIG. 9, in response to a current segment of a file to be indexed, at block 901, processing logic determines whether the current segment is already included in the super file. If not, at block 902, the current segment is appended to the super file. If the current segment is already included in the super file, at block 903, processing logic determines whether a next segment of the file exists as a next segment in the super file. If not, at block 904, the last predetermined number of terms, k, of the current segment are appended to the super file. At block 905, processing logic determines whether a next segment of the file exists somewhere in the super file. If the next segment exists somewhere in the super file, at block 906, the first predetermined number of terms of the next segment of the file are appended to the super file. Thereafter, at block 907, processing logic advances to a next segment of the file and the above operations repeat for the remaining segments of the file to be indexed. Other operations may also be performed. In one embodiment, the predetermined number of terms, k, is chosen based on the number of terms to be supported in phrase and/or proximity queries.

Figure 10:
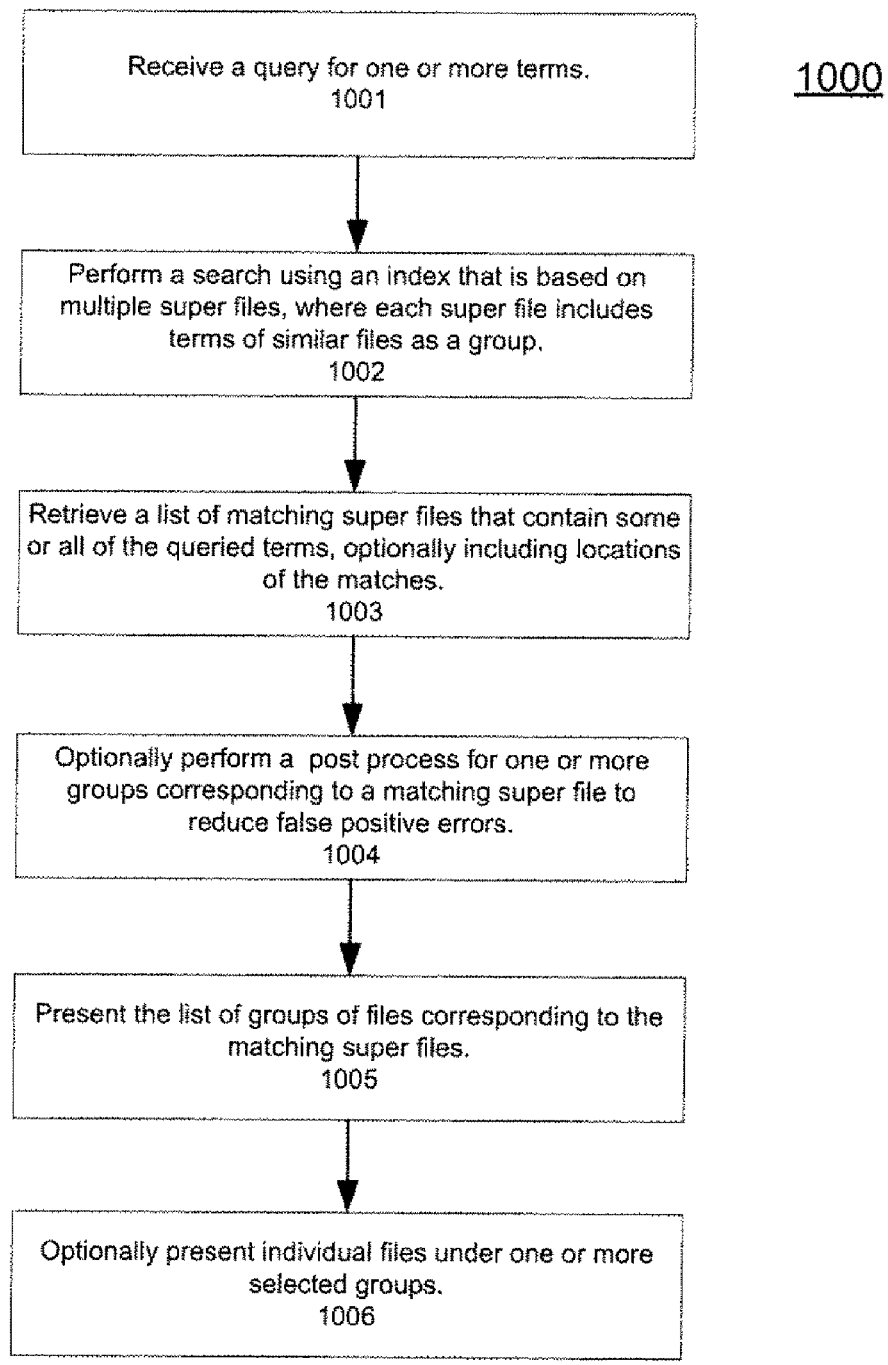
FIG. 10 is a flow diagram illustrating a process for querying according to one embodiment of the invention.

Once the super files for groups of similar files have been indexed, the indexed super files may be used for queries for searching groups of files and/or individual files based on certain terms or sequences of terms. FIG. 10 is a flow diagram illustrating a process for querying based on indexed super files according to one embodiment of the invention. Note that process 1000 may be performed by processing logic which may include software, hardware, or a combination of both. For example, process 1000 may be performed by systems as shown in FIGS. 2-3. Referring to FIG. 10, at block 1001, when a search query is received, at block 1002, processing logic performs a query using an index that is based on super files, where each super file includes terms or sequences of terms of a group of similar files. At block 1003, a list of one or more super files that matches the query is retrieved from the index, optionally including locations of the matches. Optionally, at block 1004, a post process may be performed to remove or reduce certain false positive errors. For example, processing logic may check if there exists a file in a group corresponding to a super file such that a location of match overlaps with the locations of the terms of the file in the super file. At block 1005, a list of groups of similar files is presented to the client that originated the query, where each group corresponds to a super file. After a list of groups of similar files is presented to the client, at block 1006, in response to a further request, individual similar files may be presented with optional filtering operations. For example, for each file in a matching group, processing logic may check if a location of match overlaps with the locations of the terms of the file in the super file. In the example of FIG. 4B, the term of file 1 is located at term 1 in the super file S1. Consequently, if the query matches super file S1 at term 2, file 1 may be omitted from presentation to the client because term 2 does not overlap with the location of the term of file 1 in the super file S1. Other operations may also be performed.

Figure 11:
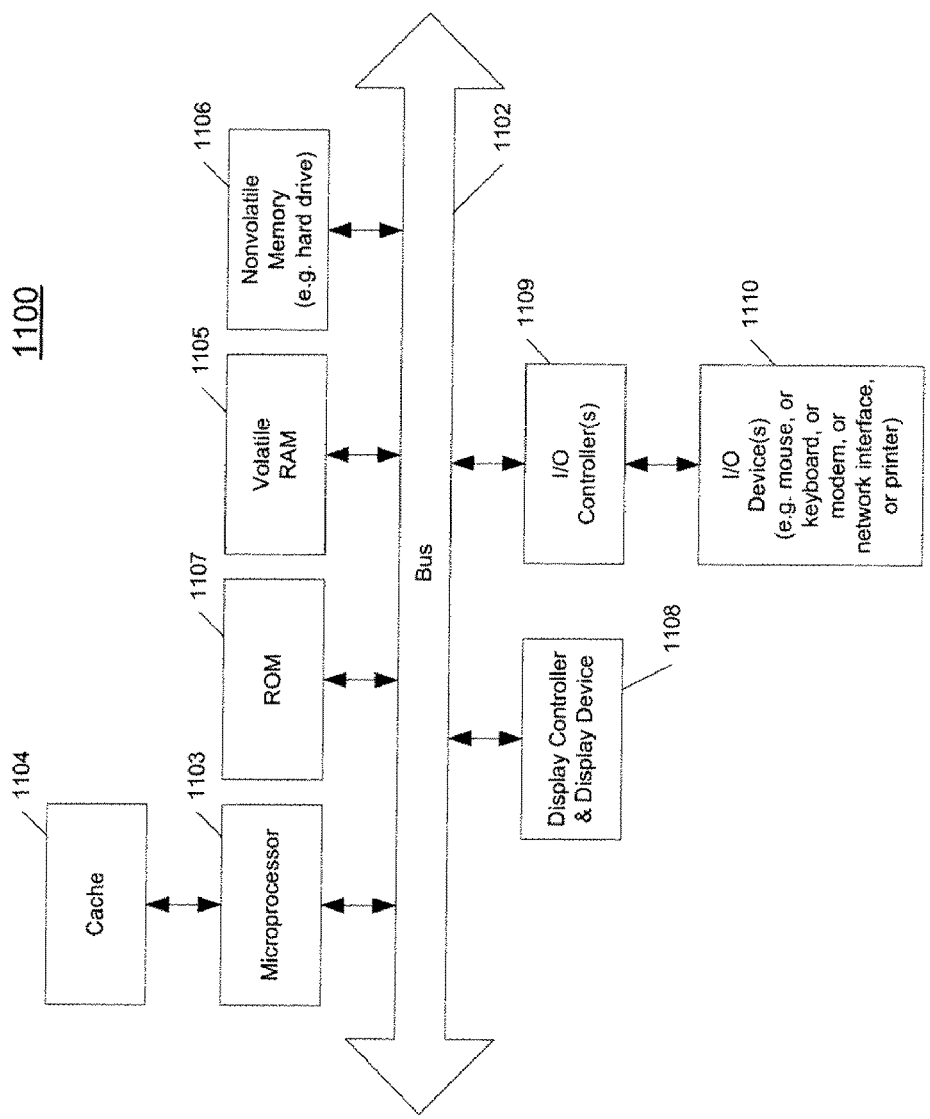
FIG. 11 is a block diagram of a data processing system which may be used with one embodiment of the invention.

FIG. 11 is a block diagram of a data processing system which may be used with one embodiment of the invention. For example, the system 1100 shown in FIG. 11 may be used as a client computer system such as clients 201-202 of FIG. 2. Alternatively, the exemplary system 1100 may be implemented as a server 204 of FIG. 2.

Note that while FIG. 11 illustrates various components of a computer system, it is not intended to represent any particular architecture or manner of interconnecting the components; as such details are not germane to the present invention. It will also be appreciated that network computers, handheld computers, cell phones, and other data processing systems which have fewer components or perhaps more components may also be used with the present invention. The computer system of FIG. 11 may, for example, be an Apple Macintosh computer or an IBM compatible PC.

As shown in FIG. 11, the computer system 1100, which is a form of a data processing system, includes a bus 1102 which is coupled to a microprocessor 1103 and a ROM 1107, a volatile RAM 1105, and a non-volatile memory 1106. The microprocessor 1103, which may be, for example, an Intel processor or a PowerPC processor, is coupled to cache memory 1104 as shown in the example of FIG. 11. The bus 1102 interconnects these various components together and also interconnects these components 1103, 1107, 1105, and 1106 to a display controller and display device 1108, as well as to input/output (I/O) devices 1110, which may be mice, keyboards, modems, network interfaces, printers, and other devices which are well-known in the art.

Typically, the input/output devices 1110 are coupled to the system through input/output controllers 1109. The volatile RAM 1105 is typically implemented as dynamic RAM (DRAM) which requires power continuously in order to refresh or maintain the data in the memory. The non-volatile memory 1106 is typically a magnetic hard drive, a magnetic optical drive, an optical drive, a DVD RAM, a Flash memory, or other type of memory system which maintains data even after power is removed from the system. Typically, the non-volatile memory will also be a random access memory, although this is not required.

While FIG. 11 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1102 may include one or more buses connected to each other through various bridges, controllers, and/or adapters, as is well-known in the art. In one embodiment, the I/O controller 1109 includes a USB (Universal Serial Bus) adapter for controlling USB peripherals. Alternatively, I/O controller 1109 may include an IEEE-1394 adapter, also known as FireWire adapter, for controlling FireWire devices. Other components may also be included.

Thus, techniques for efficiently indexing and searching similar data have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method, the method comprising:

constructing a super file for each group of similar files to include one or more sequences of one or more terms from the similar files of each group, wherein the one or more sequences of the one or more terms are non-repeating terms within the super file;

indexing the super file for each group based on the one or more sequences of the one or more terms contained within the super file, without indexing associated similar files, including in response to a new file to be indexed, identifying, by a processor, a group of files that the new file belongs to, updating a super file associated with the identified group to include one or more sequences of one or more terms of the new file, and reindexing the updated super file;

in response to a query for one or more terms received from a client, accessing a query index to retrieve a list of one or more super files that have been indexed by an indexing engine to form the query index, wherein each super file includes a super set of terms extracted from content of the associated group of similar files, wherein the super set of terms are generated by parsing and tokenizing each of the associated group of similar files into one or more sequences of one or more terms;

presenting the list of one or more super files to the client, each of the one or more super files including at least one of the one or more queried terms; and in response to an input from the client for selecting one of the super files in the list, presenting to the client one or more of the similar files associated with the selected super file.

2. The method of claim 1, further comprising:
performing ranking among the one or more super files; and
presenting to the client one or more super files that are ranked most relevant to the queried terms.

3. The method of claim 1, wherein presenting the one or more super files comprises determining whether a file represented by one of the one or more super files matches one or more terms of the query, wherein the super file is presented whether the file matches the one or more terms of the query.

4. The method of claim 1, further comprising:
performing ranking among the similar files associated with the selected super file; and
presenting to the client one or more similar files associated with the selected super file that are ranked most relevant to the queried terms.

5. The method of claim 1, wherein presenting one or more of the similar files comprises determining whether one of the one or more similar files matches one or more terms of the query, wherein the file is presented whether the file matches the one or more terms of the query.

6. The method of claim 1, further comprising tracking which similar files are represented by the super file.

7. The method of claim 1, further comprising tracking which and where of the terms within a super file that each file in the associated group contains.

8. The method of claim 1, wherein constructing a super file comprises:
in response to a set of files to be indexed, grouping the files into one or more groups based on similarity of the files; and
for each group creating a super file containing all terms or sequences of terms obtained from the associated files.

9. The method of claim 8, wherein creating a super file comprises:
including in the super file one or more sequences of one or more terms obtained from a file selected from a group of files;
for each of remaining files in the group, determining whether each segment of a remaining file exists in the super file; and
appending a segment of the remaining file to the super file whether the segment does not exist in the super file.

10. The method of claim 9, wherein determining whether each segment of the remaining file exists in the super file comprises:
determining whether a current segment of a file exists in the super file, the file having a plurality of segment and each segment having a plurality of terms; and
appending the current segment in the super file whether the current segment does not exist in the super file.

11. The method of claim 10, further comprising:
determining whether a next segment exists as a next segment in the super file if the current segment exists in the super file; and
appending the last predetermined number of terms of the current segment to the super file if the next segment does not exist.

12. The method of claim 11, further comprising:
determining whether a next segment of the file exist within the super file if the current segment does not exist in the super file; and
appending the first predetermined number of terms of the next segment to the super file if the next segment exists in the super file.

13. The method of claim 1, further comprising:
creating a new group for the new file whether an existing group is not identifiable;
creating a new super file for the new group; and
indexing the new super file.

14. A non-transitory machine-readable storage medium having instructions stored therein, which when executed by a processor, cause the processor to perform a method, the method comprising:
constructing a super file for each group of similar files to include one or more sequences of one or more terms from the similar files of each group, wherein the one or more sequences of the one or more terms are non-repeating terms within the super file;
indexing the super file for each group based on the one or more sequences of the one or more terms contained within the super file, without indexing associated similar files, including
in response to a new file to be indexed, identifying a group of files that the new file belongs to,
updating a super file associated with the identified group to include one or more sequences of one or more terms of the new file, and
reindexing the updated super file;
in response to a query for one or more terms received from a client, accessing a query index to retrieve a list of one or more super files that have been indexed by an indexing engine to form the query index, wherein each super file includes a super set of terms extracted from content of the associated group of similar files, wherein the super set of terms are generated by parsing and tokenizing each of the associated group of similar files into one or more sequences of one or more terms;
presenting the list of one or more super files to the client, each of the one or more super files including at least one of the one or more queried terms; and
in response to an input from the client for selecting one of the super files, presenting to the client one or more of the similar files associated with the selected super file.

15. The non-transitory machine-readable storage medium of claim 14, wherein the method further comprises:
performing ranking among the one or more super files; and
presenting to the client one or more super files that are ranked most relevant to the queried terms.

16. The non-transitory machine-readable storage medium of claim 14, wherein presenting the one or more super files comprises determining whether a file represented by one of the one or more super files matches one or more terms of the query, wherein the super file is presented whether the file matches the one or more terms of the query.

17. The non-transitory machine-readable storage medium of claim 14, wherein the method further comprises:
performing ranking among the similar files associated with the selected super file; and
presenting to the client one or more similar files associated with the selected super file that are ranked most relevant to the queried terms.

18. The non-transitory machine-readable storage medium of claim 14, wherein presenting one or more of the similar files comprises determining whether one of the one or more similar files matches one or more terms of the query, wherein the file is presented whether the file matches the one or more terms of the query.

19. A data processing system, the system comprising:
a processor; and
a memory for storing instructions, which when executed by the processor, cause the processor to
construct a super file for each group of similar files to include one or more sequences of one or more terms from the similar files of each group, wherein the one or more sequences of the one or more terms are non-repeating terms within the super file,
index the super file for each group based on the one or more sequences of the one or more terms contained within the super file, without indexing associated similar files, including
in response to a new file to be indexed, identifying a group of files that the new file belongs to,
updating a super file associated with the identified group to include one or more sequences of one or more terms of the new file, and
reindexing the updated super file,
in response to a query for one or more terms received from a client, access a query index to retrieve a list of one or more super files, wherein each super file includes a super set of terms extracted from the associated group of similar files, wherein the super set of terms are generated by parsing and tokenizing each of the associated group of similar files into one or more sequences of one or more terms,
present the list of one or more super files to the client, each of the one or more super files including at least one of the one or more queried terms, and
in response to an input from the client for selecting one of the super files, presenting to the client one or more of the similar files associated with the selected super file.

20. The system of claim 19, wherein the instructions, which when executed by the processor, cause the processor further to
perform ranking among the one or more super files, and
present to the client one or more super files that are ranked most relevant to the queried terms.

21. The system of claim 19, wherein presenting the one or more super files comprises determining whether a file represented by one of the one or more super files matches one or more terms of the query, wherein the super file is presented whether the file matches the one or more terms of the query.

22. The system of claim 19, wherein the instructions, which when executed by the processor, cause the processor further to
perform ranking among the similar files associated with the selected super file, and
present to the client one or more similar files associated with the selected super file that are ranked most relevant to the queried terms.

23. The system of claim 19, wherein presenting one or more of the similar files comprises determining whether one of the one or more similar files matches one or more terms of the query, wherein the file is presented whether the file matches the one or more terms of the query.

* * * * *